Patented Feb. 27, 1934

1,949,344

UNITED STATES PATENT OFFICE 1,949,344

PROCESS FOR THE PREPARATION OF METHYL ETHER

John C. Woodhouse, Wilmington, Del., assignor to E. I. du Pont de Nemours & Company, Wilmington, Del., a corporation of Delaware No Drawing. Application May 18, 1931
Serial No. 538,259

4 Claims. (Cl. 260—151)

This invention relates to a process for the preparation of ethers and particularly to a process for the preparation of methyl ether from methanol by dehydration thereof in the presence of a new type of catalyst.

Various methods have been proposed for the preparation of ethers from alcohols. Senderens, Annales de Chimie et de Physique 8, Vol. 25, page 505 (1912), prepared diethyl ether by passing ethyl alcohol over aluminum oxide, as a contact mass, at a temperature of 300° C. Ralph H. McKee and Stephen P. Burke, Ind. & Eng. Chem. 15 (8) 788–95, describe the preparation of methyl ether from methyl alcohol in this way. Other dehydrating catalysts have been proposed for this purpose.

With a view to providing a new type of dehydrating catalyst for the preparation of ethers from alcohols having advantages over those which have heretofore been employed, an object of the present invention is to describe a method for the preparation of, and a process for, the use of such catalysts. Other objects will hereinafter appear.

I have found that a catalyst well adapted for commercial installations in which large quantities of alcohol may be converted to ether and one which maintains a high degree of activity over an extended period, even under such operating conditions, can readily be prepared in accord with this invention. This catalyst which consists essentially of aluminum phosphate may be formed in the following manner: 3.3 parts by weight of aluminum nitrate (Al(NO$_3$)$_3$·9H$_2$O) are dissolved in 35 parts by weight of water, to this solution is added a solution containing 1 part of ammonium acid phosphate (NH$_4$H$_2$PO$_4$) in 9 parts of water, the resulting solution is made alkaline with ammonia, the precipitated aluminum phosphate is washed thoroughly with distilled water, filtered, dried, and pelleted. The pellets after heating to 400° C. are ready for use.

The above described catalyst may be employed in the following manner for the preparation of ethers from alcohols. While the description is given for the preparation of methyl ether from methanol, nevertheless, this catalyst may also be used for the preparation of the higher symmetrical or unsymmetrical ethers from the higher alcohols or mixtures thereof.

Methanol vapor, which is preheated to a temperature of, for example, from 175–500° C. and preferably to a temperature in the neighborhood of 375° C., is passed thru a conversion chamber adapted for pressure operation of gaseous reactions. The conversion chamber is charged with an aluminum phosphate catalyst which may be prepared as described above. The preheated methanol is injected into this converter, in which a pressure of from one to 200 atmospheres is maintained with an optimum pressure in the proximity of 15 atmospheres, the gas being passed thru the converter at a space velocity of from 200–30,000, preferably at approximately 5000. The space velocity is, in this instance, the volume of methanol, taken at standard temperatures and pressures, passing per hour over a unit volume of the catalyst. By conducting the above conversion at the optimum temperature, pressure, and space velocity a yield of approximately 99% of reacted methanol to methyl ether will be realized.

While the above example specifies specific temperatures, pressures, and space velocities, others may be employed without departing from this invention.

Owing to the fact that methanol at temperatures much above 150° C. is susceptible of breaking down into methane, carbon monoxide and hydrogen in the presence of iron, it is advisable that the conversion apparatus and all equipment leading thereto, with which the methanol contacts, at such elevated temperatures, should consist of aluminum, aluminum alloys, copper, or steel lined with such metals or other metals which inhibit the breaking down of the methanol. Other inactive linings, such as porcelain or glass, may likewise be employed.

From the above specification it will be realized that any process for the preparation of ethers from alcohols by catalytic dehydration in the presence of the above described catalyst will come within the scope of this invention without sacrificing any of the advantages that may be derived therefrom.

I claim:
1. A process for the manufacture of methyl ether which comprises catalytically dehydrating methanol in the vapor phase and in the presence of an aluminum phosphate catalyst.
2. A process for the manufacture of methyl ether which comprises bringing methanol in the vapor phase into contact with an aluminum phosphate catalyst at elevated temperature and pressure.
3. A process for the manufacture of methyl ether which comprises contacting methanol with an aluminum phosphate catalyst at a temperature of approximately 375° C., a pressure of approximately 15 atmospheres, and at a space velocity of approximately 5,000.
4. In a process for the manufacture of methyl ether by the dehydration of methanol, the step which comprises effecting the dehydration in the vapor phase and in the presence of an aluminum phosphate catalyst.

JOHN C. WOODHOUSE.